Patented Sept. 19, 1939

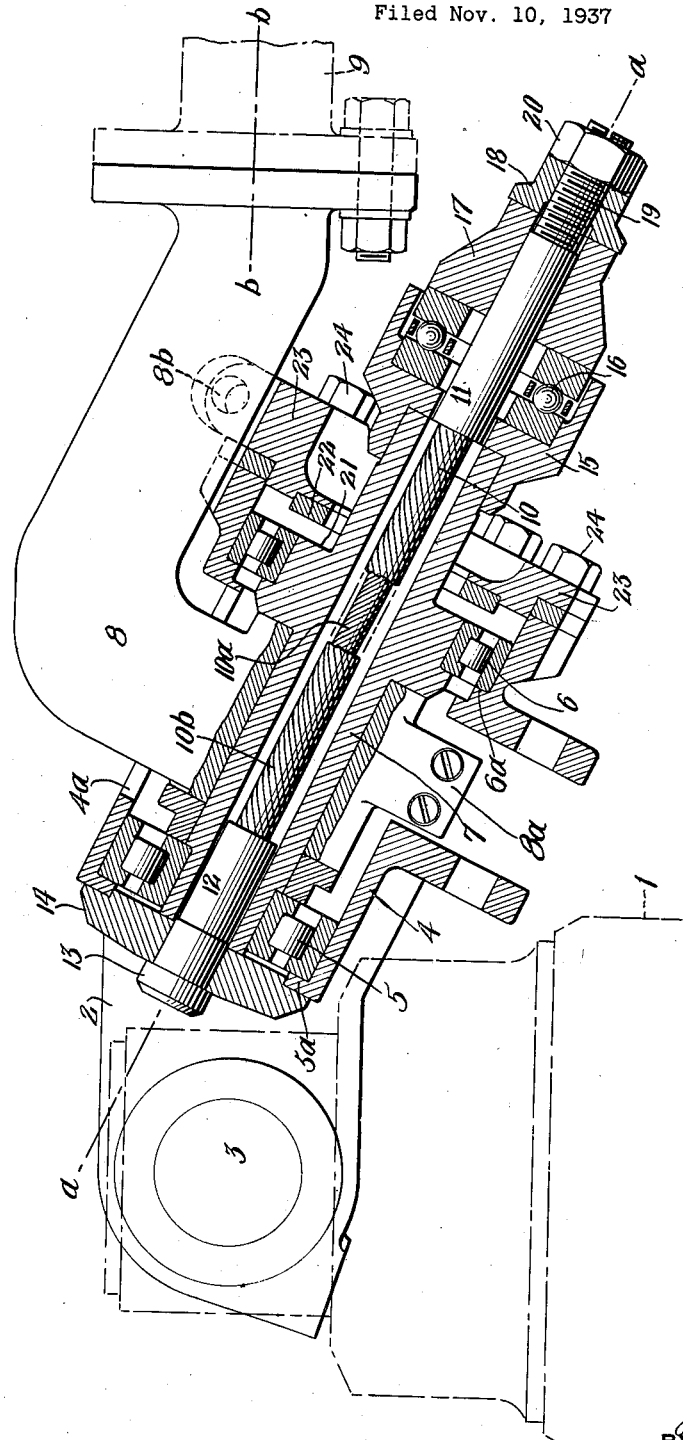

2,173,153

UNITED STATES PATENT OFFICE 2,173,153

AIRCRAFT SUSTAINING ROTOR

James Allan Jamieson Bennett, Esher, and George Bertrand Leslie Ellis, Thames Ditton, England, assignors, by mesne assignments, to Autogiro Company of America, a corporation of Delaware Application November 10, 1937, Serial No. 173,916
In Great Britain November 12, 1936

2 Claims. (Cl. 244—18)

The present invention relates to aircraft sustaining rotors of the kind having one or more blades radially disposed about a generally vertical axis on which the rotor is rotatable, said blades being individually articulated to a hub member by pivotal connections.

The nature, objects and advantages of the invention will be better understood after a brief consideration of certain prior rotor blade mountings, as follows:

British patent specifications No. 420,322 (and the corresponding United States application of Juan de la Cierva, Serial No. 738,349, filed August 3, 1934) discloses inter alia an aircraft sustaining rotor having articulated blade mountings including (for each blade) a pivotal connection providing a pivot axis inclined upwardly and outwardly with respect to the blade axis. British patent specification No. 452,364 (and the corresponding United States application of Juan de la Cierva, Serial No. 59,292, filed January 15, 1936) discloses inter alia a somewhat similar aircraft sustaining rotor, but wherein an inclined pivot axis of the blade mounting is directed downwardly and outwardly.

When a rotor blade is mounted by an obliquely inclined pivot for example of the kind above referred to, the pivot is subjected to radial as well as end loading by the centrifugal force, and if the pivot axis is inclined at a small acute angle, e. g., about 25° to the blade axis, the end load is usually considerably greater than the radial load (although this is not universally the case on account of bending in the blade) and in practice it has been found difficult to obtain a thrust bearing capable of sustaining the end load and yet having a small enough frictional moment. Similarly, pivotal blade mountings subject to heavy end loading are required in rotors with "feathering" blades.

It should be understood that an oblique or inclined pivot may be replaced by a compound pivot mechanism having two or more real axes and suitable constraints for suppressing the unwanted degrees of freedom, in such a way that movement of the blade about the several pivot axes is compounded to produce movement about an inclined virtual axis. Such mechanism is described in the copending patent application No. 139,814, filed April 29, 1937, in the name of Juan de la Cierva.

It should further be explained that a very low frictional moment (or more generally, intrinsic moment of resistance) in the pivot mechanism is only required in relation to the oscillations about the pivots which occur in flight. The oscillations in flight about an inclined pivot of the kind described in applications 738,349 and 59,292 (or the end loaded component pivot of an equivalent compound pivot mechanism) are very small, i. e., not exceeding in amplitude about three degrees and it is only within this range that the end loaded pivot need have a very small resistance moment. However, if the rotor operates autorotatively and is adapted for automatic pitch variation of a substantial degree in order to obtain a "vertical take-off" as disclosed in patent applicaton No. 738,349 and No. 139,814, appreciably greater angular movements or oscillations about the end-loaded pivot occur at the take-off, but as to these movements the intrinsic moment of resistance of the pivot need not be especially low.

The oscillative nature of the motion in flight adds to the difficulty experienced with thrust bearings, since, unless means are provided to superimpose a continuous rotation of the bearing members on their oscillating motion, the loading is continuously concentrated at certain points and breakdown rapidly ensues unless the bearing is of much greater capacity than would be sufficient to carry the same end load with continuous rotation. To obtain a low frictional moment however, the bearing diameter must be as small as possible resulting in a very high local concentration of loading. Thus the two above requirements are obviously incompatible.

The main object of this invention is therefore to provide, in an aircraft sustaining rotor with articulated blade mountings, a pivot mechanism adapted to sustain heavy end loading and whose moment of resistance to relative rotation of its parts, when so loaded, is smaller than that of any ordinary thrust bearing, at least for small relative displacements of the pivot parts from their normal position.

The present invention therefore contemplates the provision of a pivotal mechanism for rotor blade mounting comprising means for transmitting end load from one to the other of two relatively rotatable pivot parts, which means include an elastic member of high resistance to end load and low torsional rigidity; the relatively rotatable parts having in other respects limited axial freedom relatively to each other. The arrangement is such that substantially the whole end load sustained by the pivotal mechanism is transmitted by the elastic member. This member is preferably relatively short and wholly contained within the pivotal mechanism.

More particularly the invention comprises a pivotal mechanism as described above, in which the elastic member is in series with an anti-friction thrust bearing of more conventional type; i. e., these parts are so disposed that the end load is transmitted through the thrust bearing and then through the elastic member. Separately acting radial bearings are also preferably provided.

The resistance moment of the torsionally resilient member or connection, though small, is an elastic restoring moment and is proportional to the amount of angular rotation on the pivot from the equilibrium position. The member causes substantially no frictional restraint. It will be seen that, the thrust bearing and the torsionally resilient connection being in series as mentioned above, movement on the thrust bearing will not occur until the torsional connection has twisted through a sufficient angle to set up an elastic restoring moment exceeding the frictional moment of the thrust bearing and that for relative displacements of the pivot parts, within the limits thus defined, there is no frictional resistance other than that attributable to the radial bearing loads transmitted by the radial bearings.

On the other hand, any more extended relative rotation of the pivot parts will be accommodated by rotation of the thrust bearing without further twisting of the torsional connection; and the resistance moment of the pivot even during extreme pivotal movements (such as occur during the blade pitch changes incident to direct or vertical take-off) will never exceed the frictional moment of the bearing. For this reason the use of a thrust bearing in this way is especially advantageous in rotors adapted for automatic vertical take-off, involving pivotal movements more extensive than those occurring in flight and against which an extremely low resistance is not a necessity, as already stated.

It is convenient to arrange the torsionally flexible connection to carry the end load in tension and for this purpose a short length of stranded wire cable arranged axially of the end loaded pivot is preferred. The torsional resilience of a stranded cable is very much less than that of a solid bar of the same tensile load-carrying capacity; and this is advantageous for the purpose in view; but its elastic stretch for a given load is very much greater than that of an equivalent solid bar and as the end load to be sustained is heavy the amount of stretch to be taken up is considerable. This may be accommodated by giving the pivot mechanism sufficient and suitably arranged axial clearances.

This stretching and contracting of the cable takes place whenever the load is imposed and withdrawn respectively, i. e., it would occur every time the rotor is started and stopped, and such repeated relative movements of the pivot parts are undesirable. It is therefore preferable to avoid this by initially loading the cable up to about the minimum load carried in flight, by providing suitable abutments and tensioning means, and, if this is done, only the usual working axial clearances are required.

If an ordinary twisted cable is used in which the "lay" of the inner and outer strands is of the same hand, the elastic axial stretching on loading the cable, is accompanied by a certain "spin" or elastic twist, tending to subject the pivot to a torsional bias which must be relieved by suitable means, e. g., by relative rotation of the elements of the thrust bearing arranged in series with the cable element, as already mentioned. Some means of relieving torsional bias is necessary even if the cable is subjected to initial loading as above described, because the twist is introduced on initially loading the cable.

This particular difficulty may be substantially avoided by using a "non-spinning" type of cable having the "lay" of the inner and outer strands of opposite hand, or by using a twist-less "rope" composed of a bundle of straight strands.

It is further desirable to provide the pivot assembly with supplemental thrust bearing means adapted to come into operation when the end load substantially exceeds values normally obtained in flight. In rotors adapted for vertical take-off as above mentioned, the centrifugal force of the blades just prior to the take-off is much greater than in flight, on account of the excess rotational speed with which they are endowed. For example, a forty per cent. overspeeding of the rotor, prior to take-off, will cause nearly a hundred per cent. centrifugal overload. On the other hand in order to reduce the torsional rigidity of the resilient connection, it is desirable to keep its cross sectional area as low as possible, and this means working at the highest possible stress intensity in end loading, under normal flight conditions. Again, if the excess end load in the vertical take-off is taken by the torsional member a substantial additional elastic stretch must be accommodated and this reintroduces the need for axial clearances. For these reasons a suitable overload thrust bearing is particularly desirable for vertical take-off rotors. As an extremely low frictional moment is not required in the conditions obtaining up to the take-off, one of the usual standard types of bearing suffices for this purpose and this bearing must be arranged in parallel with the torsional connection and be given an initial clearance that will not be taken up until the torsional connection has undergone some axial extension beyond that present in normal flight conditions; the smaller this additional extension is, the more highly can the torsional connection be stressed in end loading in normal flight.

The nature of the invention will be more fully understood, and the present preferred manner of performing the same will be made clear, from the following description of an embodiment of the invention (given by way of example only) and having reference to the accompanying drawing which shows in central sectional elevation an articular pivot assembly for the blade mounting of an aircraft sustaining rotor.

Referring to this drawing, a drag link 2 is pivoted at 3 to the rotative hub 1 on a transverse "flapping" pivot (which may be perpendicular to the longitudinal axis of the blade, as shown, or may have some inclination or obliquity either horizontally with reference to the blade axis or vertically with reference to the rotational axis or both). The drag link includes (preferably integrally) a pivot housing 4 for an inclined pivot whose axis $a$—$a$ is inclined downwardly and outwardly with reference to the longitudinal axis $b$—$b$ of the blade. In the housing 4 are mounted two radial bearings 5, 6, in which is rotatably mounted a pivot pin 7 connected rigidly by a goose necked fitting 8 to the blade root 9, the pivot housing 4 being suitably apertured at 4$a$, to accommodate the oscillations of the member 8.

The pivot pin is hollow and within it is axially arranged the torsional connection in the form of a short length of stranded cable 10, desirably composed of inner and outer layers of strands 10a, 10b, of opposite "lay", the ends of the cable being secured in sockets 11, 12, one of which, viz., 12 is anchored in an abutment plate 14 closing the inner end of the pivot housing, being passed centrally through the abutment plate and headed at 13 to engage it on the outside. The other end socket 11 of the cable is threaded at 19 to receive an external adjusting nut 20 bearing on an abutment washer 18, which in turn bears on a spacing sleeve 17, surrounding the cable socket. The outer end of the pivot pin passes with an easy clearance through an aperture in an outer end plate 23 secured to the pivot housing 4 by studs 24, and carries an external enlargement 15 housing a ball thrust bearing 16, whose outer race abuts on the distance sleeve 17. The outer end plate 23 of the pivot housing is provided internally with a thrust bearing ring 22, of suitable bearing metal, which is normally separated by a small clearance from a coacting bearing face 21 on a flange integral with the pivot pin.

The radial bearings 5, 6 are so mounted that the pivot pin can float axially with respect to the housing to an extent limited by the clearance between the said bearing face 21 and bearing ring 22 when the inner end of the pivot pin is in contact with the abutment plate 14 closing the inner end of the housing as shown. To this end also, the housing 4 is provided with retaining flanges 5a and 6a for the outer bearing races only on the side which is nearest the rotational axis, and the outer bearing races are made an easy or sliding fit in the housing.

It has been found that a secure joint between the cable and its socket can be made by constructing the socket as a sleeve of mild steel and cold swaging it on to the cable. If this is well executed the cable will part under test before any sign of pulling out of the socket occurs.

When the parts are assembled initial tensioning of the cable is effected by screwing up the external adjusting nut 20. This operation first brings the end of the pivot pin 7 against the inner face of the abutment plate 14 as shown and thereafter puts tension on the cable 10. As the tension increases, the cable (unless it is of exactly balanced oppositely wound strands, or the equivalent) will twist and this twist is taken up by rotation on the ball thrust bearing 16. This provides a useful means of knowing when the correct initial tension has been applied; the mean end load on the pivot in normal flight being known by computation, the amount of twist per unit end load can be ascertained by experiment on the cable element before assembly and the twist corresponding to the required initial end load computed or found directly by continuing the experiment to the appropriate point. After assembly, the tension can then be adjusted correctly by seeing that the cable has the appropriate amount of twist, which can easily be ascertained by means of suitable marks on the distance sleeve 17 and the housing 15 of the ball thrust bearing 16.

This method of ascertaining the magnitude of the initial tension is not available when a "non-spinning" cable or twistless bundle of wires is used; in such a case other methods of ascertaining the tension must be employed, e. g., an experimental determination of the relation between turns of the thread 19 and load on the cable. The initial tension should be less but not much less than the minimum end load in flight, and the maximum clearance between the faces of the (plain) thrust ring 22 and the coacting-flange 21 of the pivot pin should be adequate to allow for the stretch of the cable corresponding to an increase of end loading from the initial loading to a value somewhat greater than any value obtainable in flight.

For a pivot of this kind subjected in normal flight to an end load of about 8000 lbs. a cable element 6 inches long and 0.45 inch in diameter composed of seven strands, each of 37 wires of high tensile steel of ultimate tensile strength about 100 tons per square inch has been found satisfactory, giving a restoring moment of one lb. ft. per 3 degrees total twist. Such a cable element, made up of strands laid in one direction, when loaded to 8000 lbs. undergoes a total twist of about 270°.

In the example above described the centre of the inner radial bearing 5 lies nearly on the blade axis b—b (produced) and therefore carries nearly the whole of the side component of the load on the pivot whereas the outer radial bearing being considerably offset from the line of resultant loading, which is nearly along the blade axis, is loaded very lightly in flight.

If the cable element were to fail in the air, the end load would be taken by the plain thrust bearing 21, 22 and the friction in this would immediately set up a vibration in the rotor which would be transmitted to the craft. Failure of the cable, therefore, would not result in failure of the rotor but would immediately be signalled to the pilot, warning him to land without undue delay, before other damage occurred.

It is to be observed that the structure for mounting the rotor hub on the body of the craft, the mechanism for driving the rotor prior to take-off, and other elements usual to this type of aircraft have been omitted from the drawing, as they are not per se parts of the present invention. Any of the heretofore known means of driving the rotor hub 1 may be employed, or the rotor may be driven by driving mechanism acting against the blade lug devices 8a (in the manner shown in copending United States application Serial No. 139,814 of Juan de la Cierva, filed April 29, 1937) the extreme limits of oscillation of the blade about the oblique pivot 7, as when driving or braking the rotor, being determined by stop devices spaced apart at the forward and rearward sides of the goose neck member 8, one of said limiting stops being indicated in dotted lines at 8b. For detailed description of the driving, braking, and other operations of this type of craft, reference may be had to the copending applications hereinbefore mentioned.

We claim:

1. In an aircraft sustaining rotor, a pivotal blade mounting including relatively rotatable blade mounting parts subject to axial load, a torsionally yieldable member interconnecting said parts to take said axial load, and a thrust bearing interposed in series in the connection of said member with said parts, the thrust bearing having a higher frictional moment than the resistance to torsional yielding of said member within a limited range of angular displacement of the blade mounting parts when under normal flight loading.

2. For an aircraft sustaining rotor incorporating a hub and a blade, mechanism for pivotally mounting the blade on the hub including a pair of cooperating blade mounting parts, a pivot pin pivotally interconnecting said parts, said pin being extended at an oblique angle with respect to the longitudinal blade axis, in which construction, due to the obliquity of the pivot pin, the centrifugal force of rotation of the blade sets up a substantial thrust axially of the pin, said pin being axially apertured, and a torsionally flexible and relatively inextensible tension member extended through the aperture in the pin and transmitting said axial thrust from one of said blade mounting parts to the other.

JAMES ALLAN JAMIESON BENNETT.
GEORGE BERTRAND LESLIE ELLIS.